United States Patent [19]

Theodorsen

[11] Patent Number: 4,610,042
[45] Date of Patent: Sep. 9, 1986

[54] METHOD AND APPARATUS FOR MAKING DISPOSABLE SHOE COVERS

[75] Inventor: Theodore E. Theodorsen, Manhasset, N.Y.

[73] Assignee: Kurt Salmon Associates, Inc., New York, N.Y.

[21] Appl. No.: 683,605

[22] Filed: Dec. 19, 1984

[51] Int. Cl.[4] .................. A43B 3/16; A43D 97/00
[52] U.S. Cl. .................. 12/142 R; 12/1 A; 36/7.1 R; 156/252
[58] Field of Search ............... 12/142 R, 146 C, 1 A; 156/252, 253, 291, 510; 36/9 R, 7.1 R

[56] References Cited

U.S. PATENT DOCUMENTS

| 2,024,882 | 12/1935 | Schade | 156/252 |
| 2,044,784 | 6/1936 | Harshberger | 156/252 |
| 2,071,921 | 2/1937 | Dickson | 156/252 |
| 2,647,065 | 7/1953 | Scholl | 156/252 |
| 3,051,103 | 8/1962 | Williams | 156/291 |
| 3,320,109 | 5/1967 | Braner | 156/252 |
| 3,748,205 | 7/1973 | Adams | 156/252 |
| 4,101,689 | 7/1978 | Wienand et al. | 156/252 |
| 4,304,021 | 12/1981 | Theodorsen | 12/1 A |

FOREIGN PATENT DOCUMENTS 2534376 2/1977 Fed. Rep. of Germany ...... 156/252

*Primary Examiner*—Werner H. Schroeder
*Assistant Examiner*—Steven N. Meyers

*Attorney, Agent, or Firm*—Curtis, Morris & Safford

[57] ABSTRACT

An apparatus for the continuous, automatic manufacture of individual shoe covers includes a supply of two continuous webs of material, a device for advancing each of the two webs through the apparatus, an adhesive applicator for applying an adhesive at longitudinally spaced increments to at least one of the webs, a pressing station where the webs are pressed together to form adhesively joined segments at the longitudinally spaced increments, a hole producing station where holes are made in the adhesively joined segments, a second pressing station where the webs are again pressed together, stations for sewing one longitudinal edge and selected portions of the other longitudinal edge together between adjacent adhesively joined segments, and a severing station where the webs are cut through the adhesively joined segments to form individual shoe covers. The hole producing station may include a rotatable member having a number of pins extending from it. The rotatable member is driven so that the pins make holes in the webs through the adhesively joined segments. The rotatable member may be driven in synchronism with the adhesive applicator in order to produce holes only at the desired locations, i.e., at the adhesively joined segments. The pins are advantageously heated to reduce the amount of adhesive sticking to the pins and to enhance their ability to produce holes.

19 Claims, 12 Drawing Figures

METHOD AND APPARATUS FOR MAKING DISPOSABLE SHOE COVERS

BACKGROUND OF THE INVENTION

The present invention relates, in general, to the manufacture of individual disposable shoe covers. More particularly, the present invention pertains to a method and apparatus for the continuous and substantially automatic manufacture of such shoe covers.

U.S Pat. No. 4,304,021, the disclosure of which is hereby incorporated by reference herein, illustrates an apparatus for making disposable shoe covers in which two sheets or webs of material are drawn from two supply sources, e.g., two supply reels. An adhesive, such as, for example, a pressure sensitive hot melt glue, is applied to at least one of the webs at discrete intervals along the length of the web. The webs are then pressed together at a pressing station. This pressing produces adhesively joined segments at discrete intervals along the length of the webs. Following pressing, the lateral edges of the webs are sewn together. One lateral edge is sewn continuously from one adhesively joined segment to the next adhesively joined segment. However, the other lateral edge is sewn for only a portion of the distance between adjacent adhesively joined segments, which provides an access opening for an individual's shoe. Next, the webs are severed at the adhesively joined segments to form individual shoe covers. The toe and the heel of each shoe cover are joined with an adhesive, while the bottom and the top, except for the access opening, are sewn together.

Shoe covers made using some nonwoven fabric materials may be less durable than desired. Specifically, if the material for a web has two or more layers, or acts as if it has two or more layers, a shear force on the web of sufficient magnitude may cause the layers of the web to separate. If a shoe cover is made from two webs of this type of material, such a shear force may cause the outer layer of one or both webs to separate from the inner layer. The adhesive may still hold the inner layers together, but the shoe cover will, nevertheless, be damaged and unusable. In particular, certain variations of a material made especially for shoe covers and sold under the trademark "TYVEK" act as if they have two layers. This material effectively has two layers because, during manufacture, heat is applied to the outer surfaces of the fabric in such a manner that the outer surfaces become harder than the fibrous section between them. The harder outer surfaces act as the two layers, while the fibrous section between them acts as a connector. This material is susceptible to failure if a shear force of sufficient magnitude is applied, as described above.

Accordingly, a need exists for a method and an apparatus for manufacturing durable shoe covers from material that has two or more layers or acts as if it has two or more layers.

SUMMARY OF THE INVENTION

The present invention satisfies the need for a method and an apparatus for manufacturing reliable shoe covers from material that has two or more layers or acts as if it has two or more layers. Moreover, the present invention advantageously allows dependable shoe covers to be made from a variety of fabrics, and may, in addition, increase the service life of such shoe covers. The present invention is an improvement upon the method and apparatus shown in U.S. Pat. No. 4,304,021.

In an apparatus according to the present invention, two continuous webs of material are advanced through the apparatus. An adhesive is selectively applied to at least one of the webs at longitudinally spaced increments as the web moves through the apparatus. The webs are then pressed together, thereby forming adhesively joined segments at the longitudinally spaced increments. Next, holes are produced in the adhesively joined segments, and the webs are pressed together again. One lateral edge is sewn continuously between adjacent adhesively joined segments, while the other lateral edge is sewn for only a portion of the distance between adjacent adhesively joined segments. The joined webs are severed at the adhesively joined segments to form individual shoe covers.

As indicated in the preceding paragraph, holes are made in the adhesively joined segments, and then the webs are pressed together again. This pressing operation after the holes are made forces the adhesive into the holes and causes the adhesive to completely fill the holes. When the adhesive dries or solidifies, small, rivet-like parts or members are formed. These rivet-like parts aid in joining the webs together by mechanically securing them in a fashion similar to that of a rivet fastening two sheets together.

The production of holes and the formation of the rivet-like pieces provide a twofold benefit: Stronger, more durable and reliable shoe covers may be fabricated, and materials that were considered undesirable for use in making shoe covers, since they have two layers or act as if they have two layers, may be employed. For instance, if several rows of rivet-like pieces were produced, only one or two rows could snap under a load, while the other rows would remain secure. Without the rivet-like pieces, however, the adhesive connection could completely give way under the same load, and the webs would separate. And if a material that has two layers is utilized, the rivet-like pieces provide mechanical support and help prevent the layers from separating under the influence of a shear force.

Preferably, the holes are produced by at least one rotatable member that has a number of pins extending from it. The pins are advantageously heated, such as by a hot air blower or a cartridge heater or both. The member is rotated so that the pins stick into and through the adhesively joined segments of the webs as they pass by the member. The member may be driven in synchronism with the device that selectively applies adhesive so as to produce holes in the proper places along the webs.

In a preferred embodiment of the invention, the webs are pressed together by at least one roller, both before and after the holes are produced. The roller or rollers employed for pressing after the holes are produced may be provided with a device for preventing the adhesive from sticking to the roller and building up; for instance, a device may apply talcum powder to a roller in order to prevent the build up of adhesive.

BRIEF DESCRIPTION OF THE DRAWINGS

The above and other features and advantages of the present invention will become apparent upon consideration of the following detailed description of an illustrative embodiment thereof, especially when taken in conjunction with the accompanying drawings, wherein.

DETAILED DESCRIPTION OF THE PREFERRED EMBODIMENT

Figure 1:
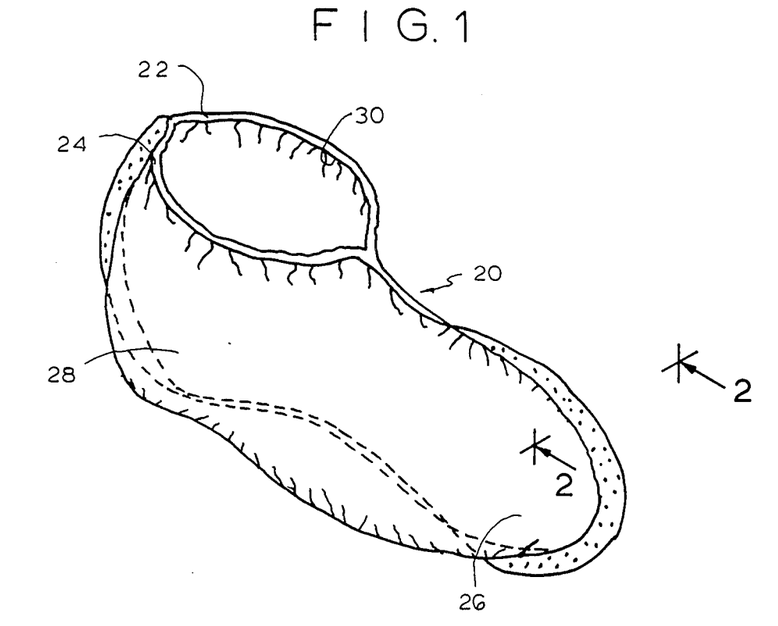
FIG. 1 is a perspective view of a shoe cover manufactured in accordance with the present invention.

Referring now to the drawings, and specifically to FIG. 1, a shoe cover made in accordance with the present invention is shown and denoted by the reference numeral 20. The shoe cover 20 is formed from two pieces of fabric material 22, 24. The two pieces of fabric 22, 24 are held together by an adhesive at the toe 26 and at the heel 28 of the shoe cover 20. In addition, the fabric pieces 22, 24 are stitched together along the bottom of the shoe cover and along the top of the shoe cover. The bottom of the shoe cover is stitched entirely between the toe 26 and the heel 28, while the top is stitched for only a portion of this distance, thereby creating an access opening 30 for an individual's foot.

Figure 2:
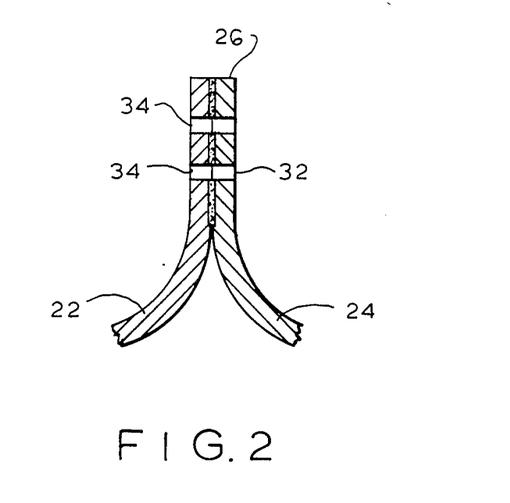
FIG. 2 is a fragmentary, sectional view of a shoe cover manufactured in accordance with the present invention taken along line 2—2 of FIG. 1.

FIG. 2 shows an enlarged section of the toe 26 of the shoe cover 20 illustrated in FIG. 1. An adhesive 32 holds the fabric pieces 22, 24 together. Holes 34 are present in the adhesively joined segment of the fabric pieces, and the adhesive 32 completely fills the holes 34. The dimensions of the holes 34 and the adhesive 32 are exaggerated in FIG. 2 for ease of illustration and explanation. As described previously, when it becomes hard, the adhesive 32 in the holes 34 functions as a mechanical fastener, i.e., like a number of small, rivet-like parts or members. Accordingly, the adhesive 32 not only adhesively joins the fabric pieces 22, 24, but also mechanically binds them together. The holes 34 permit the adhesive to contact a greater area and provide a better connection between the fabric pieces 22, 24. Furthermore, the holes 34 permit the adhesive 26, when hard, to form the mechanical fasteners. A method and an apparatus for making a shoe cover such as the one shown in FIGS. 1 and 2 are described in detail below.

Preferably, the adhesive is a pressure sensitive hot melt glue. But other adhesives are also suitable. For convenience, however, the adhesive will be referred to simply as glue in the description that follows.

Figure 3:
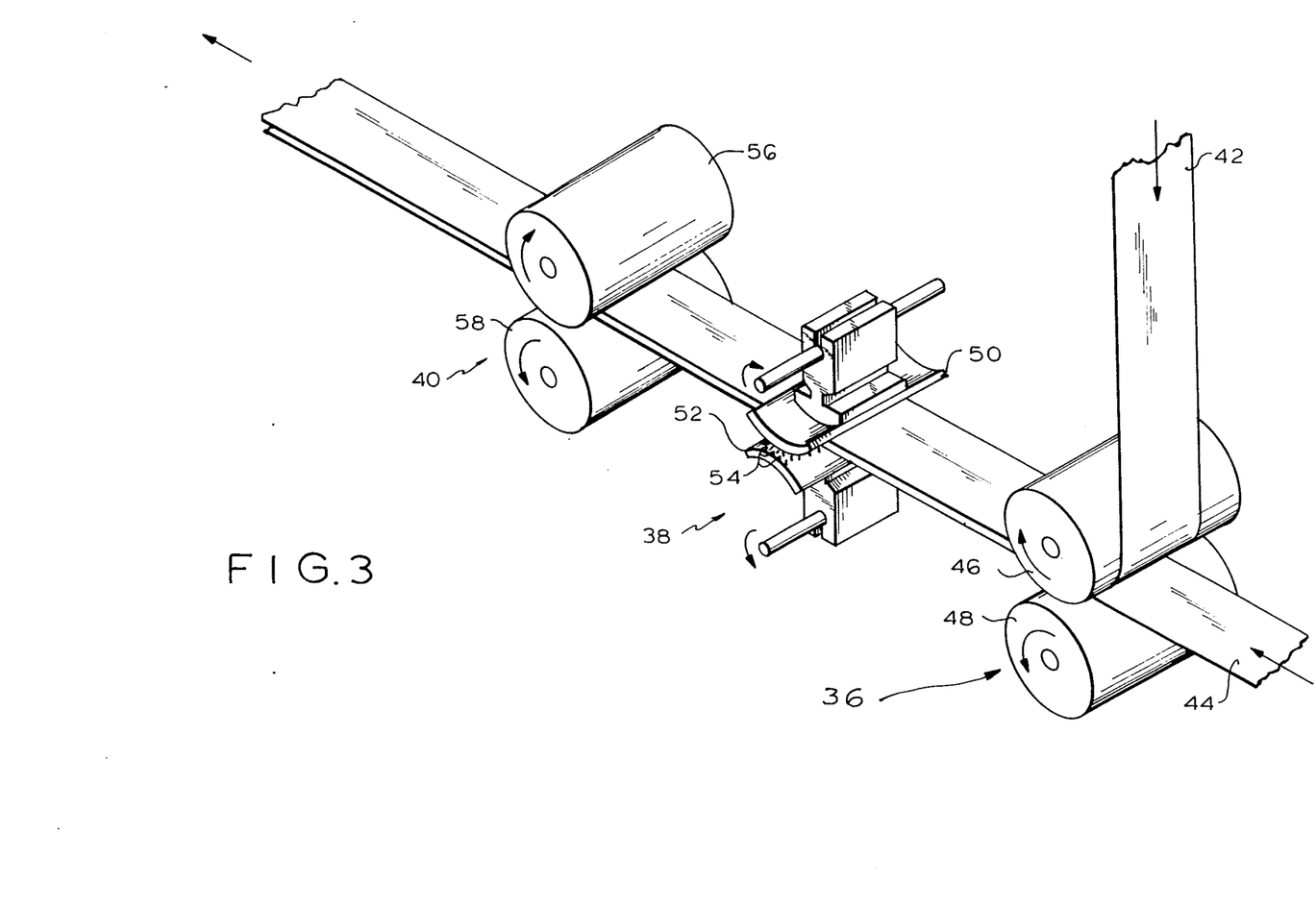
FIG. 3 is a perspective view of the mating rollers, the pin wheel station, and the pressing rollers of an apparatus in accordance with the present invention.

As indicated above, the present invention is an improvement upon the method and apparatus disclosed in U.S. Pat. No. 4,304,021 ("the '021 patent"). FIG. 3 illustrates components that may be included in the apparatus disclosed in the '021 patent in order to fabricate a shoe cover like the one shown in FIGS. 1 and 2. Specifically, FIG. 3 depicts a mating station 36, a pin wheel station 38, and a pressing station 40. The mating station 36 replaces the belt drive assembly 46 of the '021 patent, while the pin wheel station 38 and the pressing station 40 are positioned between the belt drive assembly 46 and the notching station 70 of the '021 patent.

As FIG. 3 shows, an upper web 42 and a lower web 44 are supplied to and advance through the stations 36, 38, and 40. Before the lower web 44 reaches the mating station 36, glue is applied to it, for example, by the applicator roll 58 of the '021 patent. The upper roller 46 and the lower roller 48 of the mating station 36 press the webs 42, 44 together, thereby joining the webs at the locations where the glue has been applied. Accordingly, after they leave the mating station 36, the webs 42, 44 are joined at discrete intervals along their length.

After advancing beyond the mating station 36, the webs 42, 44 are directed to the pin wheel station 38. At the pin wheel station 38, holes are made in the webs 42, 44 at the glued segments of the webs 42, 44. The mechanism for producing the holes includes an upper rotating member 50 and a lower rotating member 52. A plurality of pins 54 extend radially from each of the members 50, 52. As the webs 42, 44 move past the pin wheel station 38, the members 50, 52 rotate and the pins 54 stick into and through the webs 42, 44 to produce holes. The members 50, 52 may be driven in synchronism with the glue applicator so that they produce holes in the desired locations along the webs, i.e., only at the glued segments of the webs 42, 44. For instance, a chain and gears may be employed to cause the members 50, 52 to rotate in synchronism with a rotating glue applicator, e.g., the applicator roll 58 of the '021 patent.

After passing through the pin wheel station 38, the webs 42, 44 are directed to the pressing station 40. An upper roller 56 and a lower roller 58 at the pressing station 40 press the webs 42, 44 together and push the glue into the holes that were produced at the pin wheel station, thereby filling the holes with glue. Following pressing, the webs move to the next station in the apparatus, which may be the notching station 70 of the '021 patent. The rollers 56, 58 at the pressing station 40 and the rollers 46, 48 at the mating station 36 are advantageously driven together with the rotating members 50, 52 at the pin wheel station. If a chain-and-gear arrangement is used to drive the rotating members 50, 52 in sychronism with the glue applicator, for example, this same arrangement may be used to also drive the rollers 46, 48 and the rollers 56, 58.

Figure 4:
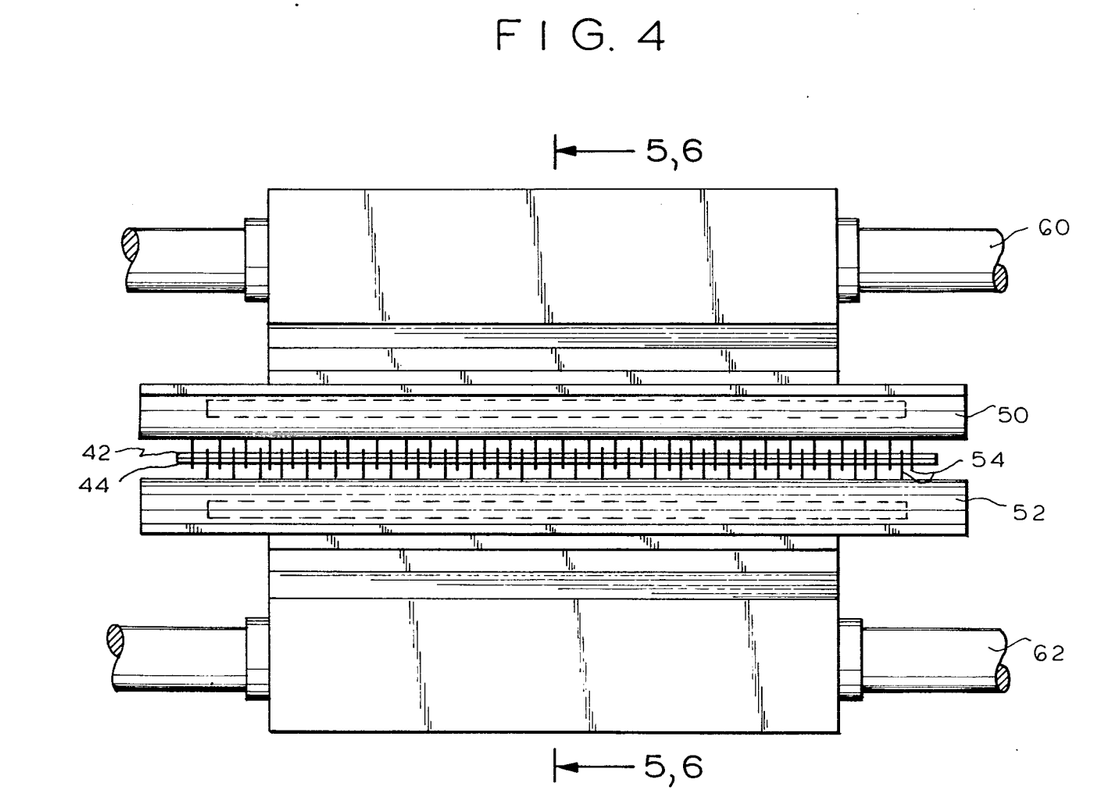
FIG. 4 is a front elevational view of the pin wheel station shown in FIG. 3.

FIG. 4 shows in greater detail the rotating members 50, 52 of the pin wheel station 38. The members 50, 52 are connected to and rotate about the shafts 60, 62, respectively. The pins 54 that extend from the upper rotating member 50 are offset from the pins 54 that extend from the lower rotating member 52. This offset allows a larger number of holes to be produced.

Figure 5:
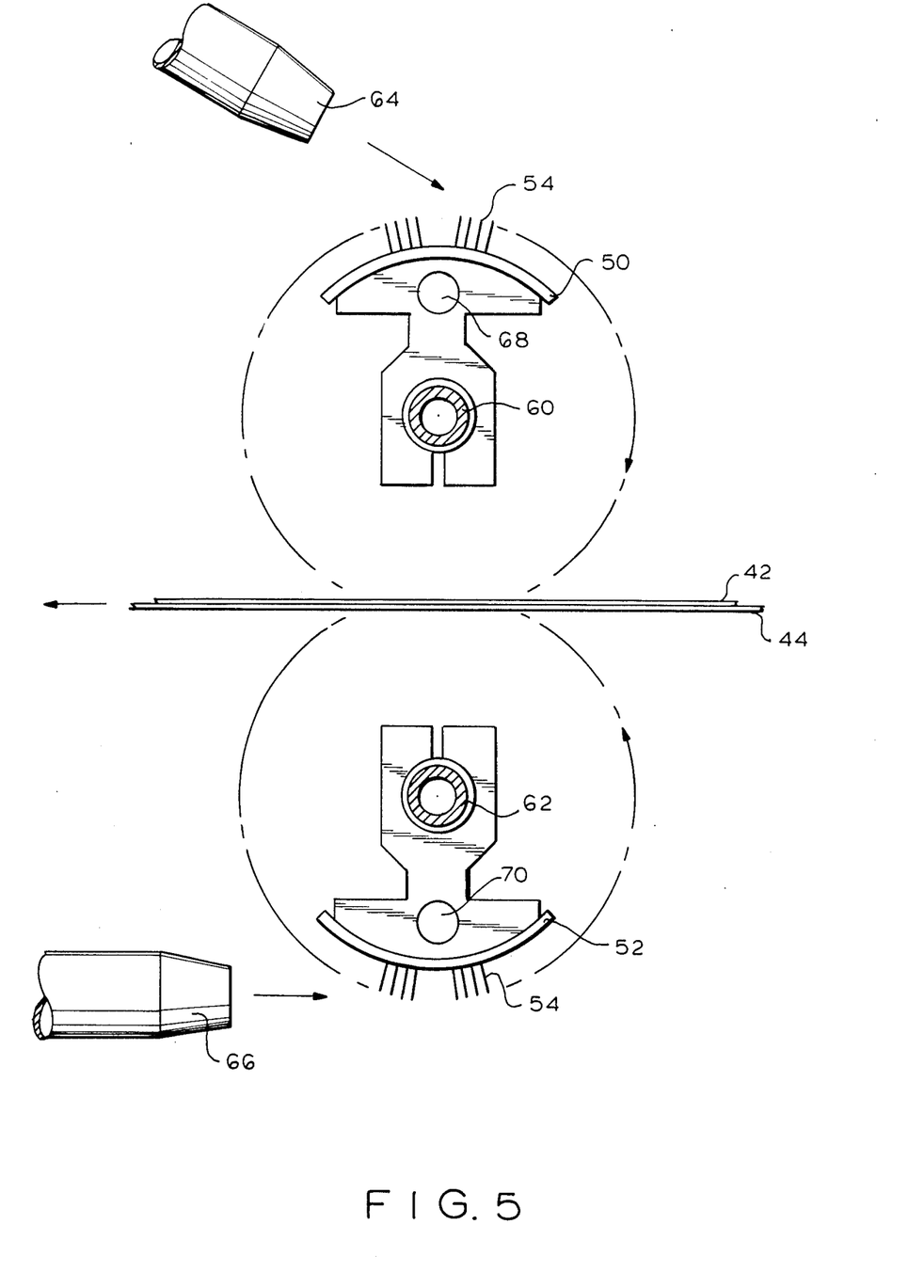
FIG. 5 is a sectional view of the pin wheel station shown in FIG. 4 taken along line 5—5 and illustrates the pin wheels when they are not producing holes.
Figure 6:
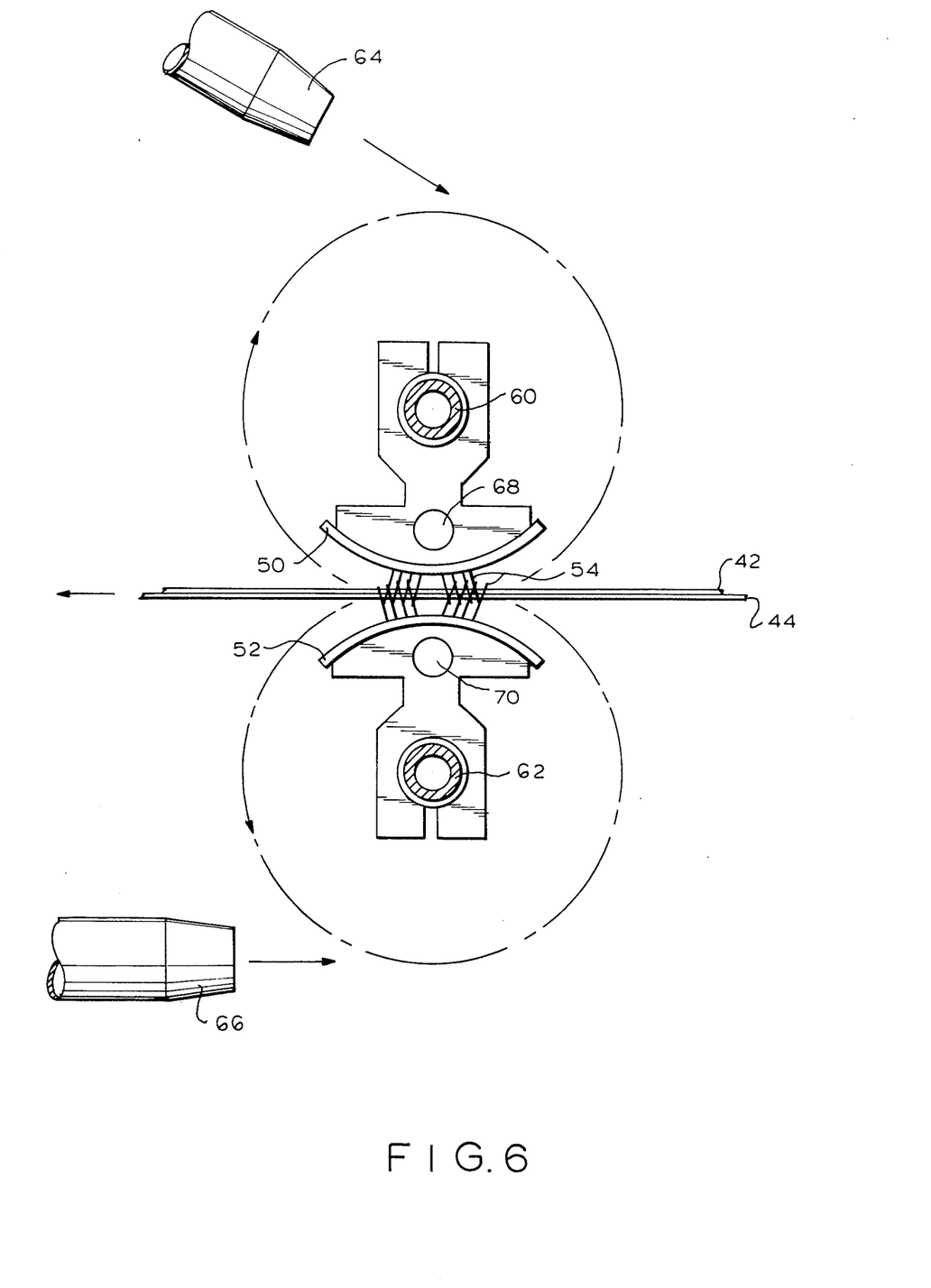
FIG. 6 is a sectional view of the pin wheel station shown in FIG. 4 taken along line 6—6 and illustrates the pin wheels when they are producing holes.

FIGS. 5 and 6 assist in explaining the operation of the pin wheel station 38. In FIG. 5, the members 52, 54 are positioned so that the pins 54 do not contact the webs 42, 44. Accordingly, the webs 42, 44 pass through the pin wheel station 38 without any holes being produced. In FIG. 6, however, the members 50, 52 are positioned so that the pins 54 protrude into and through the webs 42, 44, thereby producing holes in the webs. As indicated above, holes should be produced only in the section of the webs that has been glued. Consequently, the members 50, 52 should be driven in such a manner that the pins 54 produce holes only in the glued sections of the webs.

FIGS. 5 and 6 also show features of the pin wheel station 38 that is not illustrated in FIGS. 3 and 4: devices for heating the pins 54. Specifically, they show an upper hot air blower 64 and a lower hot air blower 66, which are used to heat the pins 54. In addition, they show an upper cartridge heater 68 and a lower cartridge heater 70, which are also used to heat the pins. The pins 54 may be heated in order to prevent the glue from adhering to the pins after they make holes in the glued segments of the webs. Moreover, heated pins may make holes more easily and neatly than nonheated pins in some fabrics, such as, for example, some plastic fabrics. Both hot air blowers and cartridge heaters may be used if the heating capacity of either type of device is insufficient to produce the desired pin temperature.

Figure 7:
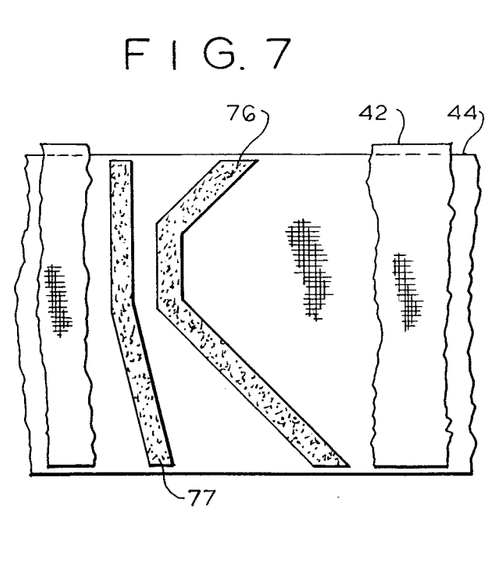
FIG. 7 is a top plan view of the webs before they arrive at the pin wheel station shown in FIG. 3 with a part of upper web broken away for clarity and depicts the pattern of the pins in relation to the glue pattern.
Figure 8:
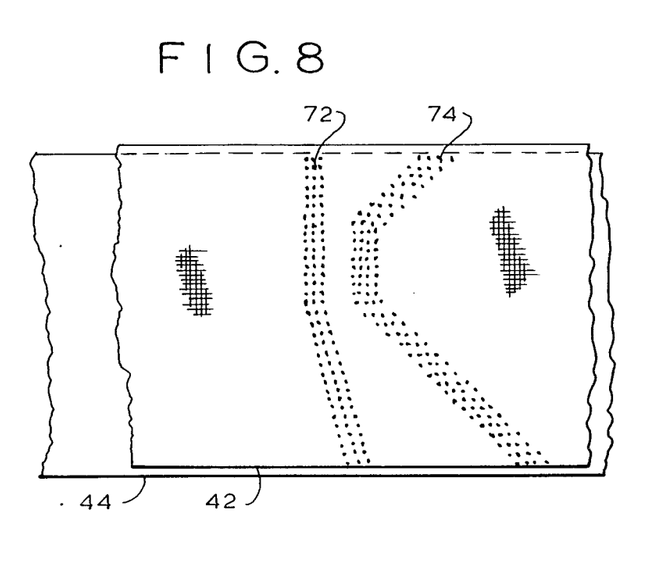
FIG. 8 is a top plan view of the webs after they leave the pin wheel station shown in FIG. 3 and depicts the pattern of the pins in the webs.

FIGS. 7 and 8 better illustrate the position of the pin holes in relation to the position of the glue. FIG. 8 illustrates the pin hole patterns 72, 74 when observed from above the webs 42, 44. The pin hole pattern 72 appears at the heel of a shoe cover, while the pin hole pattern 74 appears at the toe of the next shoe cover. In FIG. 7, part of the upper web 42 is broken away in order to show the glue patterns 76, 77. As FIGS. 7 and 8 show, the pin hole patterns 72, 74 are completely within the bounds of the glue patterns 76, 77. Individual shoe covers are formed by severing the webs 42, 44 in the nonglued area between the pin hole patterns 72, 74.

Figure 9:
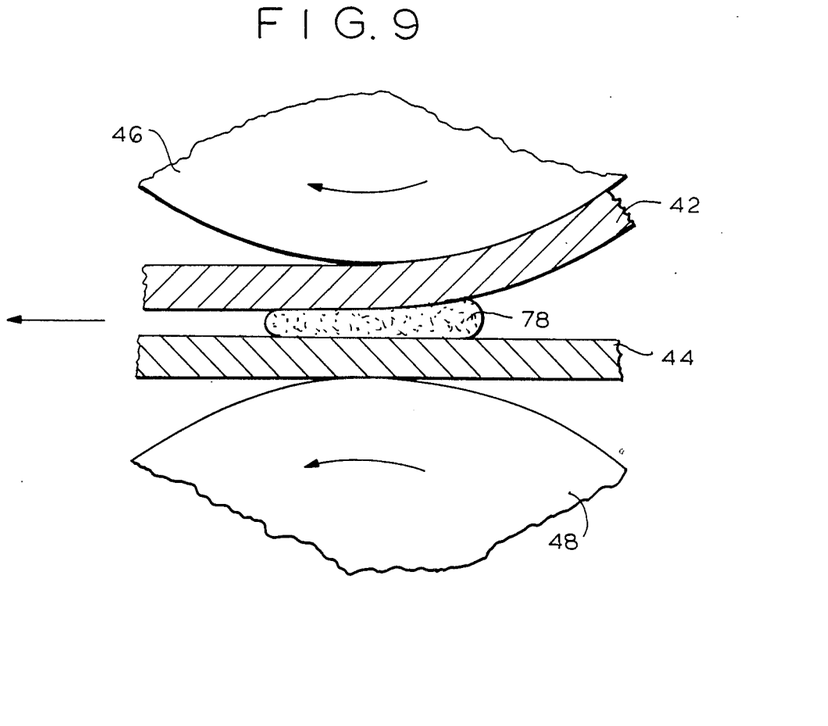
FIG. 9 is an enlarged, fragmentary, sectional view of the webs at the mating rollers shown in FIG. 3.
Figure 10:
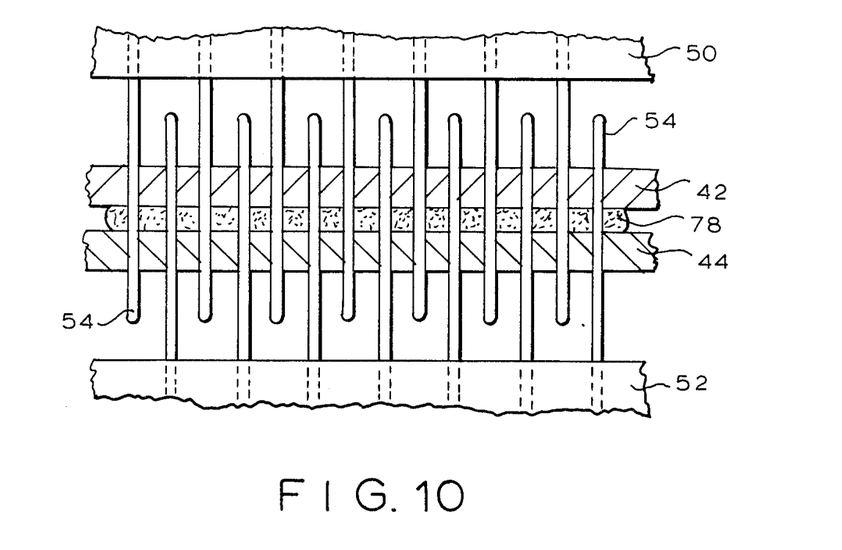
FIG. 10 is an enlarged, fragmentary, sectional view of the webs at the pin wheel station shown in FIG. 3 and illustrates the pin wheels when they are producing holes.

FIGS. 9 through 12 aid in describing what happens at each of the stations shown in FIG. 3. In these figures, various items are exaggerated in order to explain the workings of these stations. FIG. 9 shows that at the mating station 36, the glue 78, which was previously applied to the lower web 44, is pressed by the rollers 46, 48 to join a segment of the webs 42, 44. As explained above, after the webs 42, 44 are joined, they advance to the pin wheel station 38, where the glued segment of the webs 42, 44 has holes produced in it by the pins 54 of the rotatable members 50, 52. FIG. 10, like FIGS. 4 and 6, shows the pins 54 in their hole producing position at the pin wheel station 38. The pins 54 on the upper rotatable member 50 extend completely through both of the webs 42, 44. Similarly, the pins 54 on the lower rotatable member 52 extend completely through both of the webs 42, 44.

Figure 11:
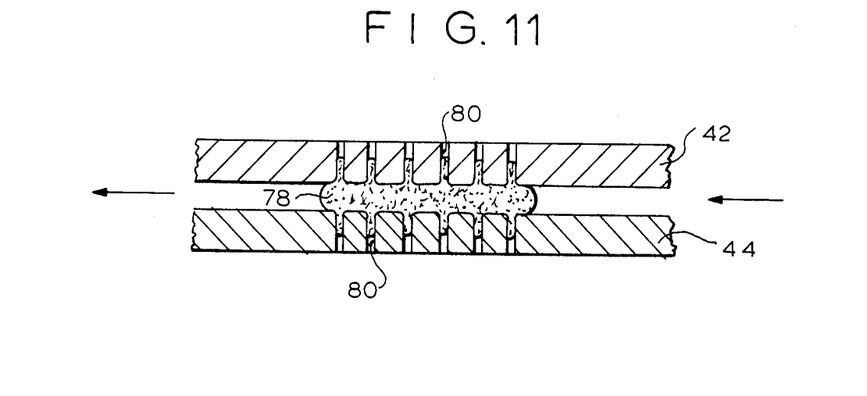
FIG. 11 is an enlarged, fragmentary, sectional view of the webs at a location between the pin wheel station and the pressing rollers shown in FIG. 3.
Figure 12:
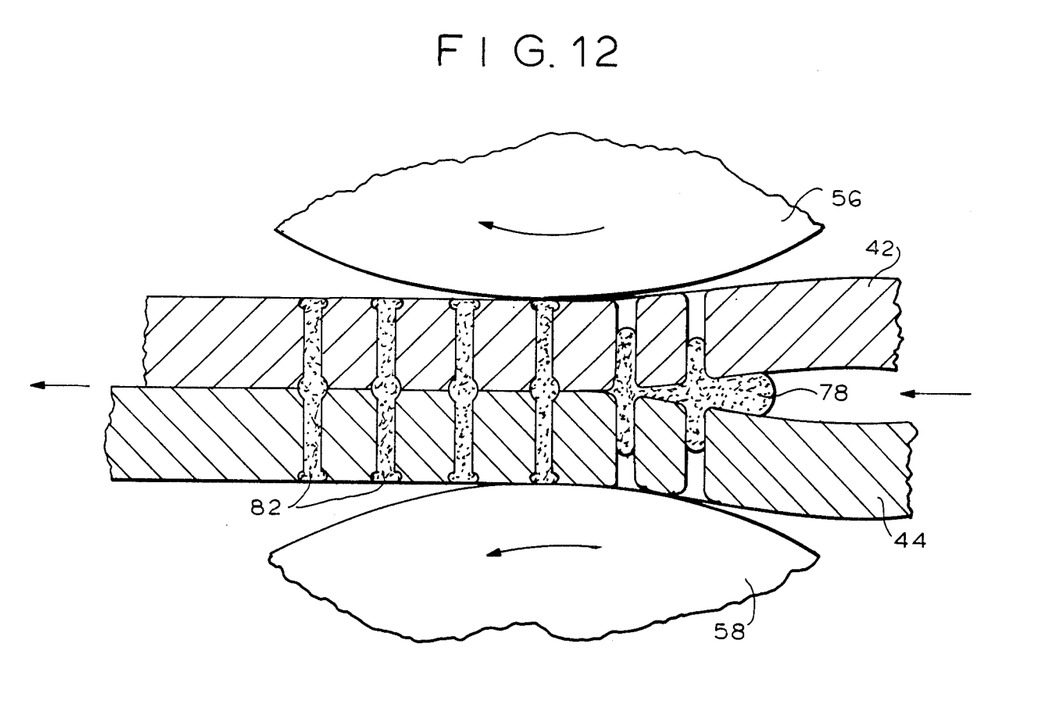
FIG. 12 is an enlarged, fragmentary, sectional view of the webs at the pressing rollers of FIG. 3.

FIG. 11 illustrates the situation at a location between the pin wheel station 38 and the pressing station 40. Once the webs 42, 44 exit the pin wheel station 38, the glue 78 flows into and partially fills the holes 80. The webs 42, 44 then travel to and through the pressing station 40. At the pressing station 40, the upper roller 56 and the lower roller 58 press the webs 42, 44 together and force the glue to completely fill the holes 80, as depicted in FIG. 12. When the glue dries and becomes hard, the hardened glue segments 82 act like small rivets to mechanically fasten the webs 42, 44 together.

As FIG. 12 shows, the rollers 56, 58 contact the glue during pressing. Due to this contact, some of the glue may stick to the rollers 56, 58. Therefore, a device for removing the glue from the rollers or preventing the glue from sticking to and building up on the rollers may be provided. Talcum powder is effective in preventing some pressure sensitive hot melt glues from sticking to silicon rubber rollers. Accordingly, the lower roller 58 may travel through a trough containing talcum powder. Additionally, a device that shakes talcum powder onto the top roller may be used.

Although a particular illustrative embodiment of the present invention has been described herein with reference to the accompanying drawings, the present invention is not limited to that particular embodiment. Various changes and modifications may be made thereto by those skilled in the art without departing from the spirit or scope of the invention, which is defined by the appended claims.

I claim:

1. An apparatus for continuous and automatic manufacture of shoe cover members, comprising:
   supply means for supplying two continuous webs of a material;
   means for advancing each of said webs of material through said apparatus;
   means for selectively applying an adhesive to at least one of said webs of material at longitudinally spaced increments as said webs advance through said apparatus;
   first means for pressing said webs together as said webs advance though said apparatus to adhere said webs together and form adhesively joined segments at said longitudinally spaced increments;
   means for producing holes in said webs at said adhesively joined segments, said hole producing means including a plurality of pins, said pins extending through each of said webs and through said adhesive to form the holes;
   second means for pressing said webs together and forcing the adhesive into the holes produced by the hole producing means;
   means for joining said webs together along the length of the first of the lateral edges thereof and along selected portions of the length of the second of the lateral edges thereof; and
   means for severing said joined webs of material at said adhesively joined segments to form shoe cover members.

2. The apparatus as defined in claim 1, wherein said means for producing holes includes at least one rotatable member and wherein said plurality of pins extends from said rotatable member.

3. The apparatus as defined in claim 1, further comprising means for heating said means for producing holes.

4. The apparatus as defined in claim 3, wherein said means for heating includes a cartridge heater.

5. The apparatus as defined in claim 3, wherein said means for heating includes hot air blowers.

6. The apparatus as defined in claim 5, wherein said means for heating further includes cartridge heaters.

7. The apparatus as defined in claim 1, wherein said first means for pressing includes at least one pair of rollers.

8. The apparatus as defined in claim 1, wherein said second means for pressing includes at least one pair of rollers.

9. The apparatus as defined in claim 1, further comprising means for preventing the adhesive from sticking to said second means for pressing.

10. The apparatus as defined in claim 9, wherein said means for preventing the adhesive from sticking includes means for applying talcum powder to said second means for pressing.

11. The apparatus as defined in claim 1, wherein said means for selectively applying an adhesive and said means for producing holes are driven in synchronism.

12. The apparatus as defined in claim 11, wherein said first means for pressing and said second means for pressing are driven in synchronism along with said means for selectively applying an adhesive and said means for producing holes.

13. A method for forming individual shoe covers, comprising:
- moving a web of fabric material from two continuous sources of supply;
- applying an adhesive at longitudinally spaced increments to at least one of said webs of fabric material along the width of the web between a first lateral edge and a second lateral edge of the web;
- initially pressing said webs together to adhere said webs together and form adhesively joined segments at said longitudinally spaced increments;
- after the applying and initial pressing steps, producing holes substantially simultaneously in each of said webs at said adhesively joined segments;
- subsequently pressing said webs together after producing the holes;
- sewing said first lateral edges of said joined webs together along a discrete length thereof which is less than the length between adjacent adhesively joined segments to define an opening along said first lateral edges between said webs of fabric material;
- sewing the second lateral edges of said joined webs together along the length thereof which is at least the length between adjacent adhesively joined segments; and
- severing said joined webs of material within said adhesively joined segments to form individual shoe cover members.

14. A method as defined in claim 13, wherein the subsequent pressing step includes pressing said webs together with rollers.

15. A method as definied in claim 14, further comprising the step of preventing adhesive from building up on said rollers.

16. A method as defined in claim 13, wherein said hole producing step includes heating a means for producing holes.

17. A method as defined in claim 16, wherein said heating step includes blowing hot air onto said means for producing holes.

18. An apparatus for continuous and automatic manufacture of a web adapted to be severed to form shoe cover members, comprising:
- supply means for supplying two continuous webs of a material;
- means for advancing each of said webs of material through said apparatus;
- means for selectively applying an adhesive to at least one of said webs of material at longitudinally spaced increments as said webs advance through said apparatus;
- first means for pressing said webs together as said webs move through said apparatus to adhere said webs together and form adhesively joined segments at said longitudinally spaced increments;
- means for producing holes in said webs at said adhesively joined segments, said hole producing means including a plurality of pins, said pins extending through each of said webs and through said adhesive to form the holes;
- second means for pressing said webs together and forcing the adhesive into the holes produced by said hole producing means; and
- means for joining said webs together along the length of the first of the lateral edges thereof and along selected portions of the length of the second of the lateral edges thereof to form joined webs which are adapted to be severed at said adhesively joined segments to form shoe cover members.

19. A method for forming a continuous web adapted to be severed to form individual shoe cover members, comprising:
- moving a web of fabric material from two continuous sources of supply;
- applying an adhesive at longitudinally spaced increments to at least one of said webs of fabric material along the width of the web between a first lateral edge and a second lateral edge of the web;
- initially pressing said webs together to adhere said webs together and form adhesively joined segments at said discrete longitudinally spaced increments;
- after the applying and initial pressing steps, producing holes substantially simultaneously in each of said webs at said adhesively joined segments;
- subsequently pressing said webs together after producing the holes;
- sewing said first lateral edges of said joined webs together along a discrete length thereof which is less than the length between adjacent adhesively joined segments to define an opening along said first lateral edges between said webs of fabric material; and
- sewing said second lateral edges of said joined webs together along the length thereof which is at least the length between adjacent adhesively joined segments to form joined webs of material which are adapted to be severed within said adhesively joined segments to form individual shoe cover members.

* * * * *